(12) United States Patent
Tiwari et al.

(10) Patent No.: US 11,987,140 B1
(45) Date of Patent: May 21, 2024

(54) VEHICLE DIGITAL CUT LOOP

(71) Applicant: Rivian IP Holdings, LLC, Plymouth, MI (US)

(72) Inventors: Rahul Rajesh Tiwari, San Jose, CA (US); Simon David Asher, Anaheim, CA (US); Martin Brian Majkut, Irvine, CA (US); Nicholas Paul Tokarz, San Jose, CA (US)

(73) Assignee: Rivian IP Holdings, LLC, Irvine, CA (US)

( * ) Notice: Subject to any disclaimer, the term of this patent is extended or adjusted under 35 U.S.C. 154(b) by 0 days.

(21) Appl. No.: 18/053,058

(22) Filed: Nov. 7, 2022

(51) Int. Cl.
*B60L 3/04* (2006.01)
*B60L 3/00* (2019.01)
*B60R 16/02* (2006.01)
*B60R 16/033* (2006.01)

(52) U.S. Cl.
CPC .............. *B60L 3/04* (2013.01); *B60L 3/0023* (2013.01); *B60R 16/033* (2013.01); *B60R 16/0207* (2013.01)

(58) Field of Classification Search
CPC ........ B60L 3/04; B60L 3/0023; B60R 16/033; B60R 16/0207
USPC .......................................................... 701/22
See application file for complete search history.

(56) References Cited

U.S. PATENT DOCUMENTS

| | | | | |
|---|---|---|---|---|
| 5,567,933 A | * | 10/1996 | Robinson | G01M 11/3109 356/73.1 |
| 2004/0210350 A1 | * | 10/2004 | Rao | B60W 30/08 701/1 |
| 2012/0050067 A1 | * | 3/2012 | Otterson | G08G 1/205 340/902 |
| 2013/0154352 A1 | * | 6/2013 | Tokarz | B60L 3/0046 307/9.1 |
| 2013/0175999 A1 | * | 7/2013 | Thieme | B60L 3/04 320/136 |
| 2015/0057865 A1 | * | 2/2015 | Stadler | B60L 3/04 701/22 |
| 2015/0370225 A1 | * | 12/2015 | McCune | G05B 9/02 700/293 |

(Continued)

OTHER PUBLICATIONS

Tesla, 2016 Model S Emergency Response Guide, pp. 14-15 of 31 (Year: 2016).*

(Continued)

*Primary Examiner* — Thomas E Worden
*Assistant Examiner* — Sean Patrick Reidy
(74) *Attorney, Agent, or Firm* — Foley & Lardner LLP

(57) ABSTRACT

The present solution provides a digital first responder cut loop. The present solution can include a system comprising a control unit executing instructions and configured to generate a signal through a harness of an electric vehicle. The signal can be indicative of a state of a cut loop of the electric vehicle. The control unit can be electrically connected to restraint control module and a battery pack associated with the electric vehicle. The controller can be configured to detect an event associated with the vehicle or a change in the signal above a threshold level. The controller can be configured to, responsive to the detection of one of the event or the change in the signal, facilitate electrical disconnection of the restraint control module of the electric vehicle or the battery pack of the electric vehicle.

19 Claims, 8 Drawing Sheets

(56) References Cited

U.S. PATENT DOCUMENTS

| | | | |
|---|---|---|---|
| 2016/0137151 A1* | 5/2016 | Bull | B60N 3/10 |
| | | | 280/735 |
| 2019/0275967 A1* | 9/2019 | Nakamura | B60R 16/03 |

OTHER PUBLICATIONS

Tesla, 2021 Model S Emergency Response Guide, pp. 9-13 of 32 (Year: 2021).*

* cited by examiner

VEHICLE DIGITAL CUT LOOP

INTRODUCTION

Electric vehicles (EVs) include battery technology that can help reduce carbon emissions when compared to vehicles with internal combustion engines. These EVs can travel over various terrains and in different weather and conditions. Handling of the vehicle can vary based on the terrain, weather or conditions.

SUMMARY

This disclosure is generally directed to a digital first responder cut loop system in an electric vehicle (EV) that provides feedback and control functionalities to the EV and generate an indication regarding the state of the cut loop system. In the event of a first responder situation, prior to gaining access to an EV, responders may implement a set of preliminary measures to ensure a safe access to the interior of the EV. One such measure can include cutting or disabling a first responder cut-loop in order to deactivate airbag deployment systems and decouple a high voltage battery of the EV from other EV systems. However, detecting the status of the cut-loop can be difficult as cut-loops may provide no indications on their state. In addition, as cut-loops can include bulky wire harnesses, they can add weight of the vehicle while also increasing a chance of harness damage, potentially causing false positive alarms and inconveniencing the driver. The present solution provides a lighter, more compact and digitally controlled cut-loop system that improves the reliability and the control of the cut-loop system, while providing indications to the EV and first responders, more accurately detecting changes to the cut-loop and distinguishing from false positive alarms, while reducing the EV's overall weight so as to extend the vehicle range and improve battery performance. In doing so, the present solution allows the EV drivers and the first responders to more accurately establish the state of the EV cut loop in the first responder situations.

At least one aspect is directed to a system. The system can include a control unit executing instruction. The control unit can be configured to generate a signal through a harness of an electric vehicle. The signal can be indicative of a state of a cut loop of the electric vehicle. The control unit can be electrically connected to a restraint control module and a battery pack associated with the electric vehicle. The control unit can be configured to detect an event associated with the vehicle or a change in the signal above a threshold level. The control unit can be configured to, responsive to the detection of one of the event or the change in the signal, facilitate electrical disconnection of the restraint control module of the electric vehicle or the battery pack of the electric vehicle.

At least one aspect is directed to a system. The system can include a harness to receive a signal indicative of a state of a cut loop of an electric vehicle. The system can include a controller configured to detect an event and to detect a change in the signal. Responsive to the detection of one of the event or the change in the signal, the controller can be configured to electrically disconnect one of a restraint control module of the electric vehicle or a battery pack of the electric vehicle.

At least one aspect is directed to a method. The method can include generating, by a control unit, a signal through a harness of the electric vehicle. The control unit can be electrically connected to a restraint control module and a battery pack associated with an electric vehicle. The signal can be indicative of a state of a cut loop of an electric vehicle. The method can include detecting, by the control unit, an event associated with the electric vehicle. The method can include detecting, by the control unit, a change in the signal above a threshold level. The method can include facilitating electrical disconnection, by the control unit, of one of the restraint control module or the battery pack in response to the detection of one of the event or the change in the signal.

At least one aspect is directed to a method. The method can include receiving, by a harness, a signal indicative of a state of a cut loop of an electric vehicle. The method can include detecting, by a controller, an event. The method can include detecting, by the controller, a change in the signal. The method can include electrically disconnecting, by the controller, one of a restraint control module of the electric vehicle or a battery pack of the electric vehicle in response to the detection of one of the event or the change in the signal.

At least one aspect is directed to an electric vehicle comprising a cut loop. The electric vehicle can include a first harness to receive a first signal indicative of a state of a cut loop of an electric vehicle. The electric vehicle can include a first control unit configured to detect an event and to detect a change in the first signal. The electric vehicle can include a second harness to receive a second signal indicative of the state of the cut loop of the electric vehicle. The electric vehicle can include a second control unit configured to detect an event and to detect a change in the second signal. One of the first control unit or the second control unit can detect the event and detect one of the change in first signal or the change in the second signal. One of the first control unit or the second control unit can facilitate electrical disconnection of a restraint control module of the electric vehicle and a battery pack of the electric vehicle, responsive to the detection of the event and the detection of one of the change in the first signal or the change in the second signal.

At least one aspect is directed to electric vehicle having an electrical circuit. The electrical circuit can include a first harness to propagate a first signal to cause a first control unit to electrically connect a restraint control module and cause one or more high voltage contactors to electrically connect a battery pack of the electric vehicle. The electrical circuit can include a second harness to propagate a second signal to cause a second control unit to electrically connect the restraint control module and cause the one or more high voltage contactors to electrically connect the battery pack. One of the first control unit and the second control unit can detect an event at the electric vehicle and detect one of the change in first signal or the change in the second signal. Responsive to the detection of the event and the detection of one of the change in the first signal or the change in the second signal, one of the first control unit or the second control unit can electrically disconnect the restraint control module and cause the one or more high voltage contactors to electrically disconnect the battery pack.

These and other aspects and implementations are discussed in detail below. The foregoing information and the following detailed description include illustrative examples of various aspects and implementations, and provide an overview or framework for understanding the nature and character of the claimed aspects and implementations. The drawings provide illustration and a further understanding of the various aspects and implementations, and are incorporated in and constitute a part of this specification. The foregoing information and the following detailed description and drawings include illustrative examples and should not be considered as limiting.

BRIEF DESCRIPTION OF THE DRAWINGS

The accompanying drawings are not intended to be drawn to scale. Like reference numbers and designations in the various drawings indicate like elements. For purposes of clarity, not every component may be labeled in every drawing. In the drawings.

DETAILED DESCRIPTION

Following below are more detailed descriptions of various concepts related to, and implementations of, methods, apparatuses, and systems of controlling the vehicle tire slip using predictive control modeling. The various concepts introduced above and discussed in greater detail below may be implemented in any of numerous ways.

The present solution is generally directed to improving the performance of a first responder cut-loop in an electric vehicle (EV) by providing digital feedback and control functionalities in order to generate first responder indications on the state of the cut-loop. In first responder situations, prior to gaining access to an EV, first responders may implement a set of preliminary measures to ensure the safe access. One such measure can include cutting a first responder cut-loop in order to disable airbag deployment systems and decouple high voltage battery from the circuitry of the EV. However, ascertaining the status of the cut-loop can be difficult as cut-loops normally provide no indications to the EV or the first responders. Moreover, as cut-loops can include bulky wire harnesses, they can add weight of the vehicle, while also increasing the chance of wear and tear and false positive signals, potentially inconveniencing the driver. The present technical solution provides a lighter, more compact and digitally-controlled cut-loop system reducing the weight of the EV, while improving the detection accuracy and control over the cut-loop system and providing indications allowing the first responders to more efficiently establish the state of the EV in the first responder situations.

Figure 1:
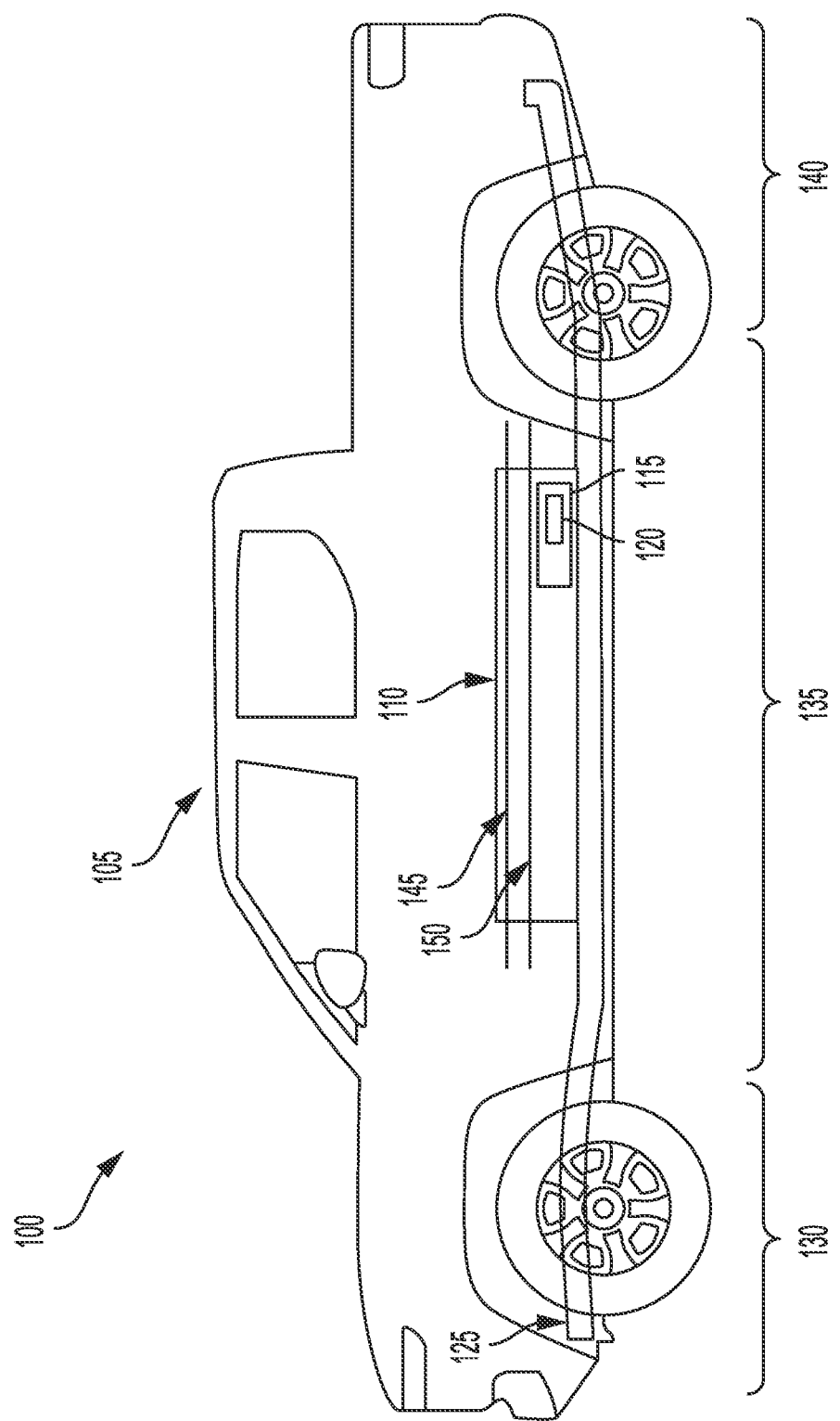
FIG. 1 depicts an example electric vehicle.

FIG. 1 depicts an example cross-sectional view 100 of an electric vehicle 105 installed with at least one battery pack 110. Electric vehicles 105, also referred to as EV 105, can include electric trucks, electric sport utility vehicles (SUVs), electric delivery vans, electric automobiles, electric cars, electric motorcycles, electric scooters, electric passenger vehicles, electric passenger or commercial trucks, hybrid vehicles, or other vehicles such as sea or air transport vehicles, planes, helicopters, submarines, boats, or drones, among other possibilities. The battery pack 110 can also be used as an energy storage system to power a building, such as a residential home or commercial building. Electric vehicles 105 can be fully electric or partially electric (e.g., plug-in hybrid) and further, electric vehicles 105 can be fully autonomous, partially autonomous, or unmanned. Electric vehicles 105 can also be human operated or non-autonomous. Electric vehicles 105 such as electric trucks or automobiles can include on-board battery packs 110, batteries 115 or battery modules 115, or battery cells 120 to power the electric vehicles. EVs 105 can include gasoline or diesel engine vehicles. The electric vehicle 105 can include a chassis 125 (e.g., a frame, internal frame, or support structure). The chassis 125 can support various components of the electric vehicle 105. The chassis 125 can span a front portion 130 (e.g., a hood or bonnet portion), a body portion 135, and a rear portion 140 (e.g., a trunk, payload, or boot portion) of the electric vehicle 105. The battery pack 110 can be installed or placed within the electric vehicle 105. For example, the battery pack 110 can be installed on the chassis 125 of the electric vehicle 105 within one or more of the front portion 130, the body portion 135, or the rear portion 140. The battery pack 110 can include or connect with at least one busbar, e.g., a current collector element. For example, the first busbar 145 and the second busbar 150 can include electrically conductive material to connect or otherwise electrically couple the battery 115, the battery modules 115, or the battery cells 120 with other electrical components of the electric vehicle 105 to provide electrical power to various systems or components of the electric vehicle 105.

Figure 2A:
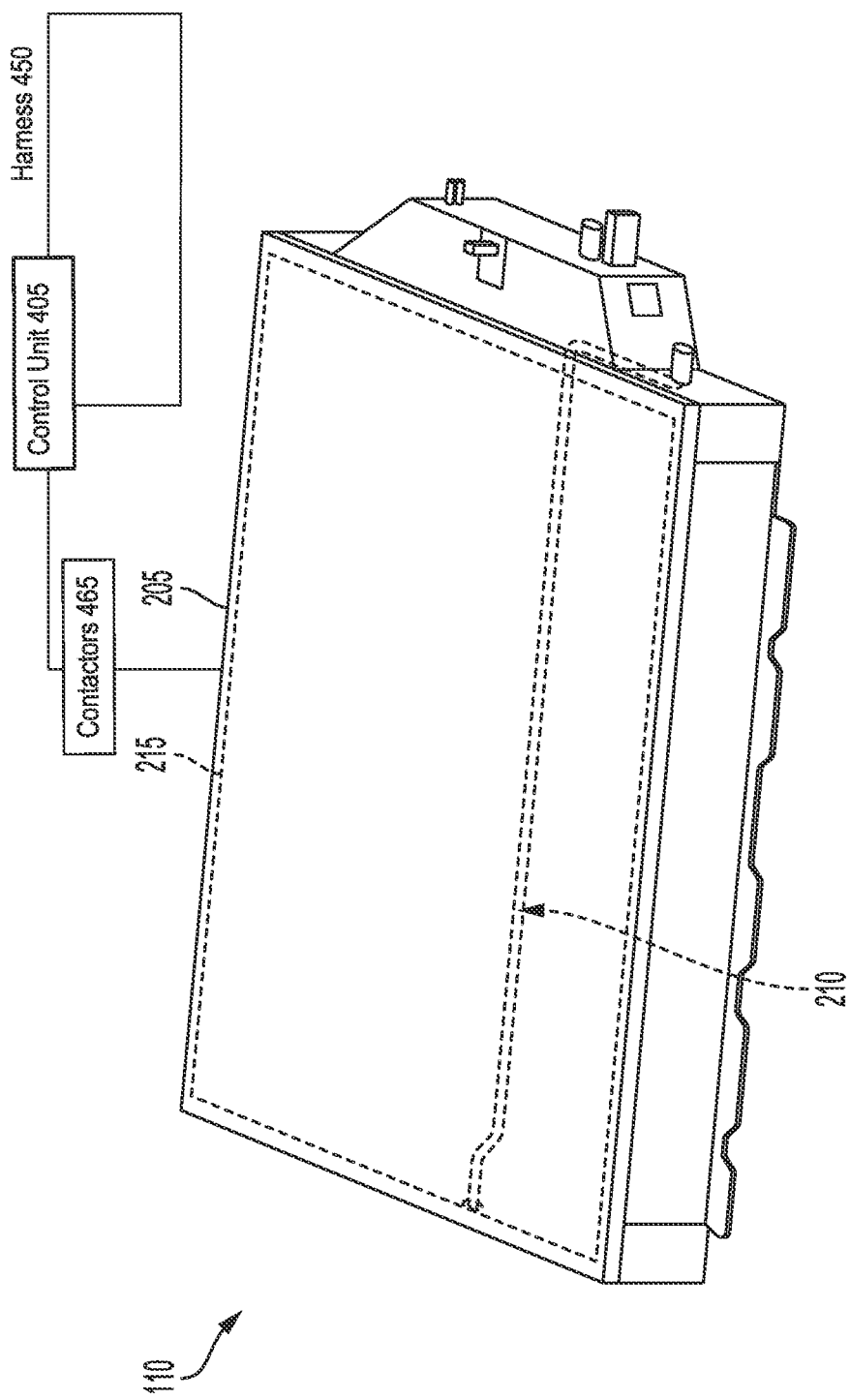
FIG. 2A depicts an example of one or more battery packs.

FIG. 2A depicts an example battery pack 110. Referring to FIG. 2A, among others, the battery pack 110 can provide power to electric vehicle 105. The battery pack 110 can be in electrical communication with one or more contactors 465 that can be used for switching power to or from the battery pack 110. For example, electrical contactors 465 can disconnect the battery pack 110 from the remainder of the EV 105, thereby electrically isolating the battery pack 110 from other systems in the EV 105. Electrical contactors 465 can be in electrical communication with a control unit 405 that can control the contactors 465. For example, the control unit 405 can send signals to facilitate electrical disconnection of the battery pack 110 from the remainder of the EV 105 in response to detecting that the cut loop harness 450 had been breached due to a signal in the harness 450 change being detected.

Battery packs 110 can include any arrangement or network of electrical, electronic, mechanical or electromechanical devices to power a vehicle of any type, such as the electric vehicle 105. The battery pack 110 can include at least one housing 205. The housing 205 can include at least one battery module 115 or at least one battery cell 120, as well as other battery pack components. The battery module 115 can be or can include one or more groups of prismatic cells, cylindrical cells, pouch cells, or other form factors of battery cells 120. The housing 205 can include a shield on the bottom or underneath the battery module 115 to protect the battery module 115 and/or cells 120 from external conditions, for example if the electric vehicle 105 is driven over rough terrains (e.g., off-road, trenches, rocks, etc.) The battery pack 110 can include at least one cooling line 210 that can distribute fluid through the battery pack 110 as part of a thermal/temperature control or heat exchange system that can also include at least one thermal component (e.g., cold plate) 215. The thermal component 215 can be positioned in relation to a top submodule and a bottom submodule, such as in between the top and bottom submodules, among other possibilities. The battery pack 110 can include any number of thermal components 215. For example, there can be one or more thermal components 215 per battery pack 110, or per battery module 115. At least one cooling line 210 can be coupled with, part of, or independent from the thermal component 215.

Figure 2B:
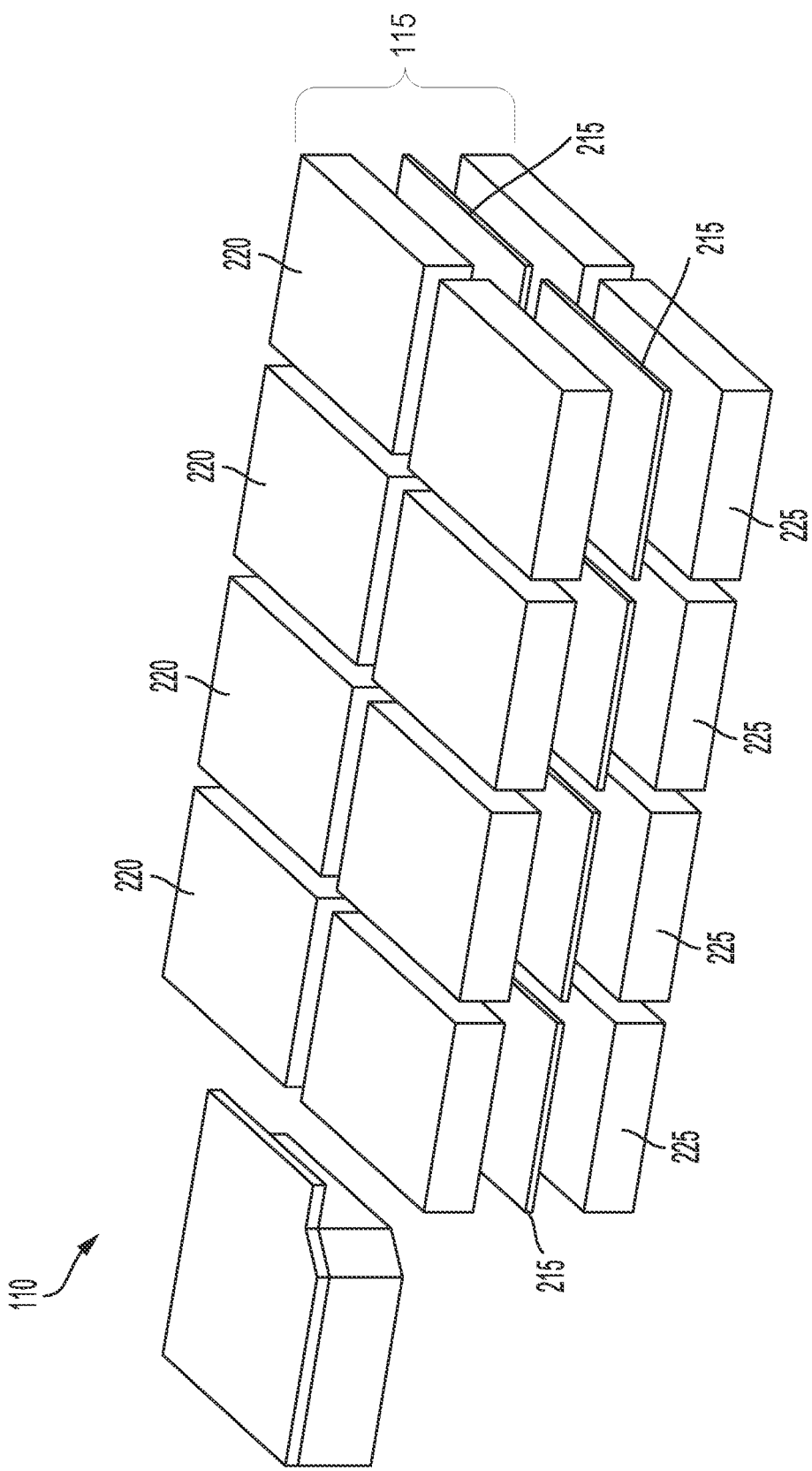
FIG. 2B depicts an example of one or more battery modules.

FIG. 2B depicts example battery modules 115, and FIGS. 2C, 2D and 2E depict an example cross sectional view of a battery cell 120. The battery modules 115 can include at least one submodule. For example, the battery modules 115 can include at least one first (e.g., top) submodule 220 or at least one second (e.g., bottom) submodule 225. At least one thermal component 215 can be disposed between the top submodule 220 and the bottom submodule 225. For example, one thermal component 215 can be configured for heat exchange with one battery module 115. The thermal component 215 can be disposed or thermally coupled between the top submodule 220 and the bottom submodule 225. One thermal component 215 can also be thermally coupled with more than one battery module 115 (or more than two submodules 220, 225). The battery submodules 220, 225 can collectively form one battery module 115. In some examples each submodule 220, 225 can be considered as a complete battery module 115, rather than a submodule.

The battery modules 115 can each include a plurality of battery cells 120. The battery modules 115 can be disposed within the housing 205 of the battery pack 110. The battery modules 115 can include battery cells 120 that are cylindrical cells or prismatic cells, for example. The battery module 115 can operate as a modular unit of battery cells 120. For example, a battery module 115 can collect current or electrical power from the battery cells 120 that are included in the battery module 115 and can provide the current or electrical power as output from the battery pack 110. The battery pack 110 can include any number of battery modules 115. For example, the battery pack can have one, two, three, four, five, six, seven, eight, nine, ten, eleven, twelve or other number of battery modules 115 disposed in the housing 205. It should also be noted that each battery module 115 may include a top submodule 220 and a bottom submodule 225, possibly with a thermal component 215 in between the top submodule 220 and the bottom submodule 225. The battery pack 110 can include or define a plurality of areas for positioning of the battery module 115 and/or cells 120. The battery modules 115 can be square, rectangular, circular, triangular, symmetrical, or asymmetrical. In some examples, battery modules 115 may be different shapes, such that some battery modules 115 are rectangular but other battery modules 115 are square shaped, among other possibilities. The battery module 115 can include or define a plurality of slots, holders, or containers for a plurality of battery cells 120.

Figure 3:
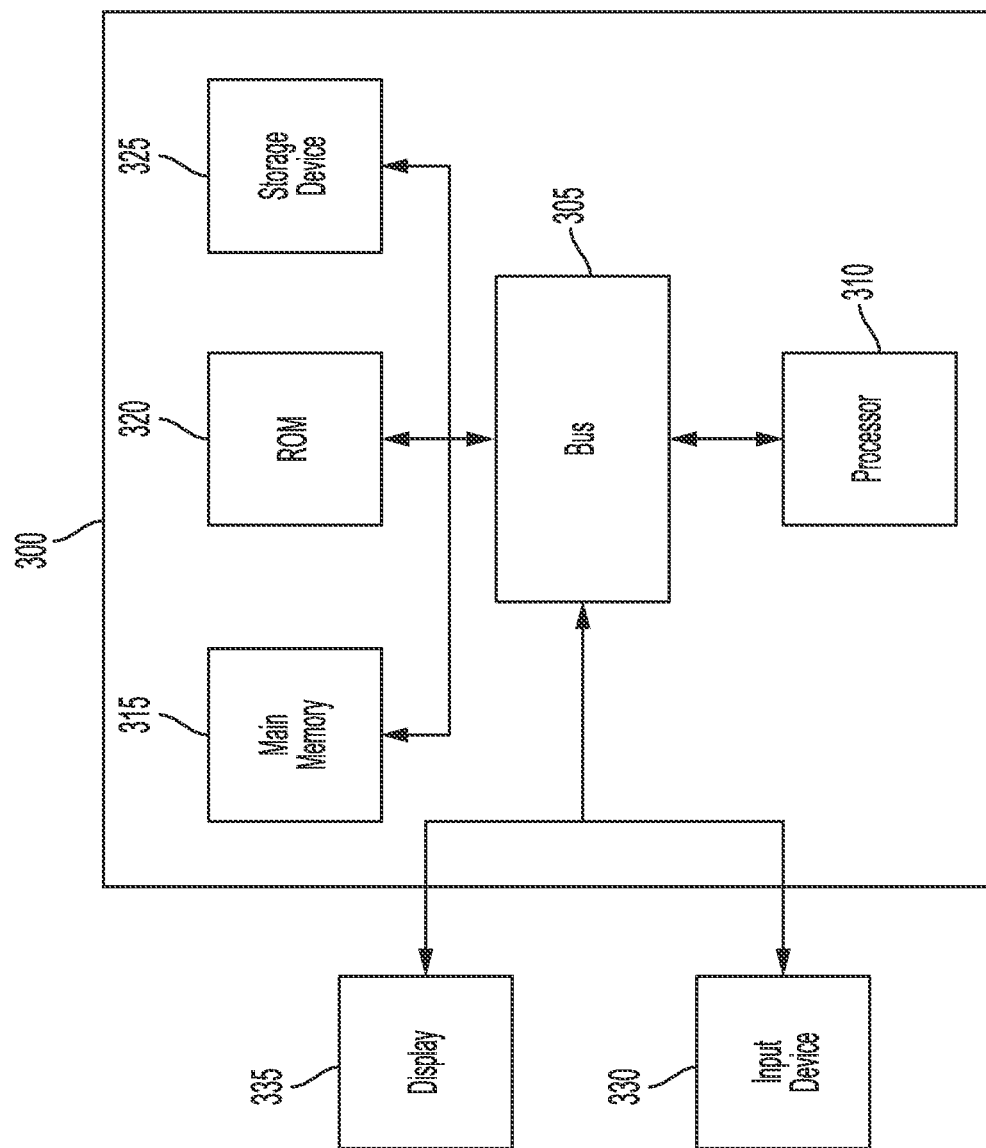
FIG. 3 is a block diagram illustrating an architecture for a computer system that can be employed to implement elements of the systems and methods described and illustrated herein.

FIG. 3 depicts an example block diagram of an example computer system 300. The computer system or computing device 300 can include or be used to implement a data processing system or its components. The computer system 300 can be used or included, for example, in a control unit 405, battery management system 460 or a notification module 410. The computing system 300 includes at least one bus 305 or other communication component for communicating information and at least one processor 310 or processing circuit coupled to the bus 305 for processing information. The computing system 300 can also include one or more processors 310 or processing circuits coupled to the bus for processing information. The computing system 300 also includes at least one main memory 315, such as a random access memory (RAM) or other dynamic storage device, coupled to the bus 305 for storing information, and instructions to be executed by the processor 310. The main memory 315 can be used for storing information during execution of instructions by the processor 310. The computing system 300 may further include at least one read only memory (ROM) 320 or other static storage device coupled to the bus 305 for storing static information and instructions for the processor 310. A storage device 325, such as a solid state device, magnetic disk or optical disk, can be coupled to the bus 305 to persistently store information and instructions.

The computing system 300 may be coupled via the bus 305 to a display 335, such as a liquid crystal display, or active matrix display, for displaying information to a user such as a driver of the electric vehicle 105 or other end user. An input device 330, such as a keyboard or voice interface may be coupled to the bus 305 for communicating information and commands to the processor 310. The input device 330 can include a touch screen display 335.

The processes, systems and methods described herein can be implemented by the computing system 300 in response to the processor 310 executing an arrangement of instructions contained in main memory 315. Such instructions can be read into main memory 315 from another computer-readable medium, such as the storage device 325. Execution of the arrangement of instructions contained in main memory 315 causes the computing system 300 to perform the illustrative processes described herein. One or more processors in a multi-processing arrangement may also be employed to execute the instructions contained in main memory 315. Hard-wired circuitry can be used in place of or in combination with software instructions together with the systems and methods described herein. Systems and methods described herein are not limited to any specific combination of hardware circuitry and software.

Although an example computing system has been described in FIG. 3, the subject matter including the operations described in this specification can be implemented in other types of digital electronic circuitry, or in computer software, firmware, or hardware, including the structures disclosed in this specification and their structural equivalents, or in combinations of one or more of them.

Figure 4:
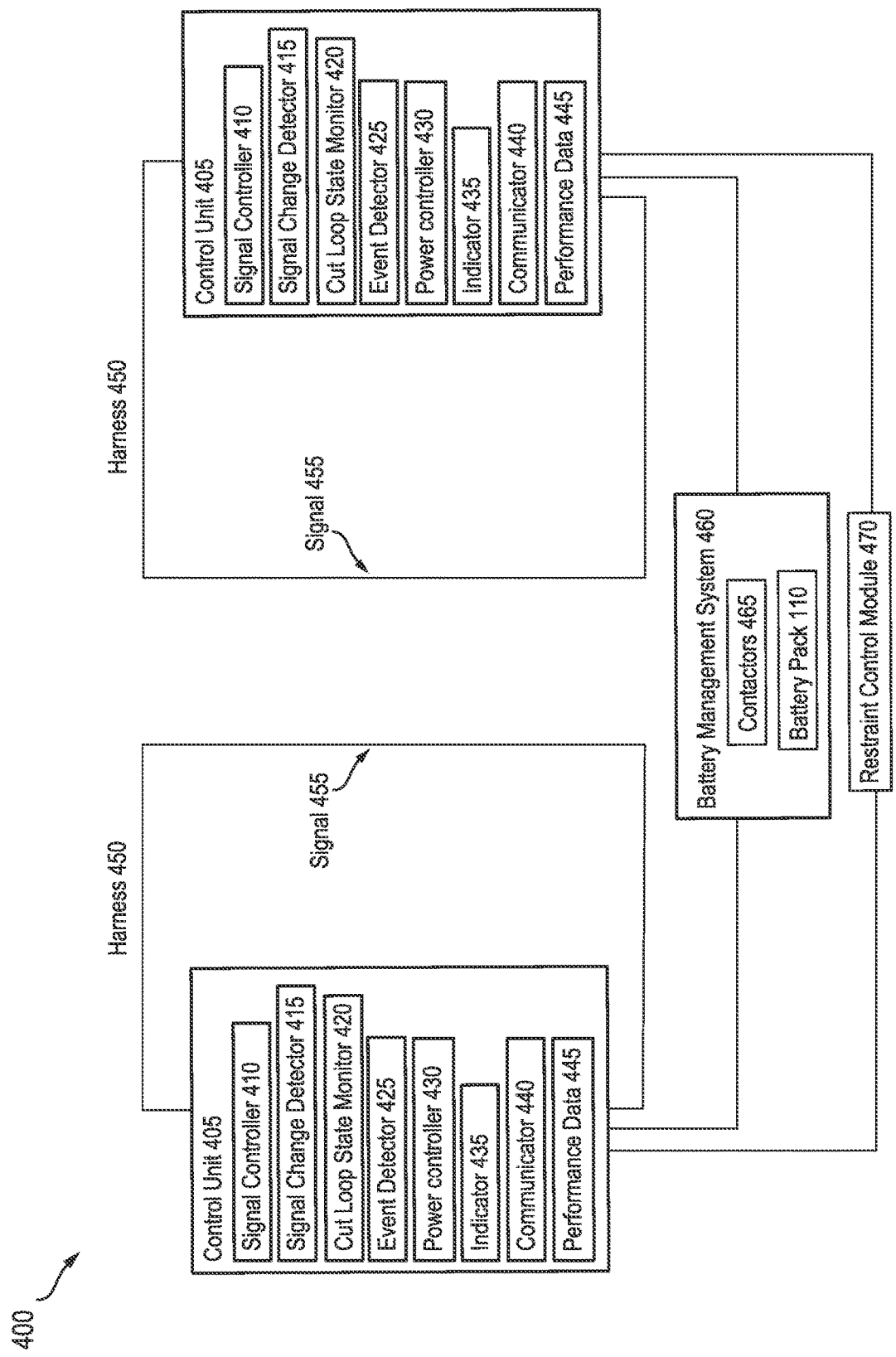
FIG. 4 is a block diagram illustrating an example of a system for implementing a digital first responder cut loop in an electric vehicle.

FIG. 4 depicts a block diagram of an example digital first responder cut loop system 400. Cut loop system 400 can include one or more control units (CUs) 405. Each control unit 405 can be coupled with a cut-loop harness 450. Each cut-loop harness 450 can be used as a medium through which a signal 455 can be propagated. Signal 455 can be indicative of the state of the cut-loop with respect to the harness 450. Control units 405 can each be in communication with a restraint control module 470 and a battery management system (BMS) 460. BMS 460 which can include one or more contactors 465 and a battery pack 110. Each CU 405 can include one or more signal controllers 410 for controlling signal 455 inputs, one or more signal change detectors 415 for detecting changes in the signal 455 and one or more event detectors 425 for detecting first responder events. Each CU 405 can include one or more cut loop state monitors 420 for monitoring state of the cut loop and one or more power controllers 430 for controlling power to the restraint control module 470 and the battery pack 110. Each CU 405 can include one or more indicators 435 for providing indications and one or more communicators 440 for communicating with other controller units 405 and performance data 445 storing data on the EV 105 performance and operation.

Control unit (CU) 405 can include any combination of hardware and software for implementing any cut loop system 400 functionality. CU 405 can include a processor, a controller, a microcontroller or a control circuit. Control unit 405 can include functions, computer code, scripts or instructions stored in memory, such as memory 315 or storage 325, and executed on one or more processors, such as processor 310. CU 405 can include any functionality for implementing any function of a cut loop system 400. Control unit 405 can input a signal 455 into the harness 450 and receive from the harness 450 an output of the signal 455. Control unit 405 can detect and monitor the signal 455 output and based on the monitoring determine a change in the signal 455 (e.g., between the signal input into the harness 450 and the signal output from the harness 450). Control unit 405 can determine the state of the cut loop system 400. Control unit 405 can detect an event at the vehicle, such as a first responder event (e.g., vehicle involved in an accident) using a restraint control module 470 (e.g., air bags deployed, seat belt safety restraint activated, etc.) or by analyzing performance data 445 (accelerometer sensors indicates vehicle rollover event). Control unit 405 can electrically disconnect the restraint control module 470 and the battery pack 110.

Harness 450, which can also be referred to as cut-loop harness 450, can include any one or more mediums for conducting signal 455. Harness 450 can include one or more wires, such as a loop of wire routed through an EV 105 and conducting a signal 455. Harness 450 can include a single wire, a pair of wires, or a bundle of two, three, four or more than four wires. Harness 450 can include an optical fiber or an optical cable. Harness 450 can include a single mode or a multi-mode optical fiber. Harness 450 can be routed through various parts of the EV 105, such as along the length of the EV 105, along a driver-side or a passenger side of the EV 105. Harness 450 can be routed through a front part or a rear part of the EV 105. Harness 450 can include a first end into which signal 455 can be input and a second end from which signal 455 can be output.

Signal 455 can include any type and form of a signal that can be routed through a harness 450. Signal 455 can include a signal that is input into a harness 450 and received at the other end of the harness 450. Signal 455 can include an analog signal or a digital signal. Signal 455 can include a pulse width modulated (PWM) signal. Signal 455 can include a digital signal indicating codes, instructions or data. Signal 455 can include a direct current (DC) (e.g. constant voltage) signal. For example, signal 455 can include a 3V, 6V, 9V, 12V or 24V DC signal. Signal 455 can include a ground signal. Signal 455 can include a pulse signal. Signal 455 can include a periodic signal. Signal 455 can include an optical signal. The optical signal can include a pulsed optical signal, a continuous optical signal, a PWM modulated optical signal or any other optical signal that can be sent via an optical fiber or a cable. Signal 455 can include any signal that can routed or propagated through the harness 450.

Signal controller 410, also referred to as the control unit 410, can include any combination of hardware and software for controlling the signal 455. Signal controller 410 can include processors, microcontrollers or any analog or digital circuitry. Signal controller 410 can include functions, computer code, scripts or instructions stored in memory, such as main memory 315 or storage device 325, and executed on one or more processors, such as processor 310, for generating or providing a signal 455. Signal controller 410 can generate a signal 455 to be input into a harness 450. Signal controller 410 can generate an analog or a digital signal 455. Signal controller 410 can generate an optical signal 455. Signal controller 410 can generate, manage or control the voltage, power or current of the signal 455. Signal controller 410 can generate, manage or control the content, data, instructions or information encoded into a PWM signal transmission. Signal controller 410 can include any functionality for inputting the signal 455 into a harness 450. Signal controller 410 can include any functionality for generating an optical signal and coupling the optical signal into the harness 450. Signal controller 410 can include any functionality for inputting an analog or a digital signal 455 into the harness 450. Signal controller 410 can communicate with the signal change detector 415 to share with, or provide to, the signal change detector 415 the signal 455 input into the harness 450.

Signal change detector 415 any combination of hardware and software for receiving the signal 455 from the harness 450 and detecting a change (e.g., loss) in the signal 455 detected from the harness 450. Signal change detector 415 can include any combination of sensors, detectors, circuitry, processors or instructions implemented in a processor to detect a change between the signal 455 input into a harness 450 and a signal 455 output from the harness 450. For example, signal change detector 415 can monitor the signal 455 output and detect power feed loss in the signal 455 (e.g., when signal 455 loses power in the harness 450, such as when the harness 450 is cut or breached).

Signal change detector 415 can determine the change between the signal input into the harness (e.g., signal 455 input by the signal controller 410) and the signal 455 output from the harness 450. Signal change detector 415 can include any type and form of a sensor or a detector for receiving the signal 455, such as an optical sensor for receiving an optical signal, or an analog or a digital circuit for receiving and determining the value or the magnitude of the received (e.g., output) analog or digital signal 455. Signal change detector 415 can receive a message indicative of the input signal 455 from the signal controller 410 into the harness 450 and determine the change (e.g., power feed loss) in the signal 455 by subtracting the signal 455 output from the harness from the input signal 455. Signal change detector 415 can determine the change in the signal (e.g., power feed loss) by comparing the signal 455 input into the harness 450 with the signal 455 output from the harness 450 or by comparing the signal 455 received from the harness 450 against a predetermined value or a threshold. The predetermined threshold can include a voltage, power or a current level or a value that the output signal 455 should exceed to indicate no breach in the cut loop harness 450 (e.g., harness 450). Signal change detector 415 can determine the change in the signal 455 (e.g., feed loss) by detecting whether any signal 455 is received from the harness 450. In the instances where no signal is received, signal change detector 415 can determine the presence of the change (e.g., feed loss). In some instances, when signal received is lower than a predetermined threshold amount of the signal power or value, the presence of the change (e.g., feed loss) can be detected.

Cut loop state monitor 420 can include any functionality for determining a state of the cut loop harness 450. The state of the cut loop can include a state of the cut loop harness 450, such as whether the cut loop harness 450 is cut or breached or if the cut loop harness 450 is intact. For example, the state of the cut loop harness 450 can include an intact state in which the cut loop harness 450 is not cut, not disabled or not disconnected. For example, the state of the cut loop harness 450 can include a breached state in which the cut loop harness 450 is cut, disabled, breached or disconnected. For example, the state of the cut loop harness 450 can include a not detected status in which the state of the cut loop harness 450 is not determined or is unknown, such as when communication is delayed or determination is not yet finalized.

Event detector 425 can include any functionality for detecting an event of a vehicle. Event detector 425 can detect any first responder event, such as a physical impact experienced by the EV 105, or an impact experienced by an EV 105 that is greater than a particular threshold for impacts. The particular thresholds for impacts can be a threshold for a particular amount of force per a unit of time, or a unit of acceleration (e.g. deceleration), such as g-value. The event can include a situation that may be addressed by one or more first responders, such as a health related situation concerning a driver or a passenger. The event can include an occurrence of a technical or a system issue of an EV 105, such as an occurrence affecting the performance of the EV.

Event detector 425 can include any combination of hardware or software for detecting the event. Event detector 425 can include any functions, computer code, scripts or instructions stored in memory, such as main memory 315 or storage device 325, and executed on one or more processors, such as processor 310, for detecting the event. Event detector 425 can include a portion of the control unit 405 that receives an event signal from a restraint control module 470. The event signal can indicate the occurrence of the event or that the event has been detected. Event detector 425 can include the functionality to read performance data 445 and determine the occurrence of the event from the performance data 445. For example, event detector 425 can analyze the performance data 445 and determine that EV 105 has experienced an event based on the analysis of performance data 445. For example, event detector 425 can detect an event in response to determining that the EV 105 was previously moving and has quickly stopped. Event detector 425 can detect an event in response to determining that one or more systems has stopped working or has turned off, or that a malfunction coincided with another occurrence, such as an EV 105 abruptly stopping. Event detector 425 can determine that event has occurred in response to performance data 445.

Performance data 445 can include any information on EV 105 performance. Performance data 445 can include data on movements of EV 105, such as velocity of EV, direction of motion, and timing of motion. Performance data 445 can include information on EV 105 stopping, such as when EV 105 is parked, has come to a full stop or has come to an abrupt stop. Performance data 445 can include information on the state of other components, such as the status of other parts of the EV 105, and their operation or availability. Performance data 445 can include a history of EV 105 performance, such as motion data, stoppage data, and usage of particular systems or features of the EV, such as data on making calls or sending messages to first responders. Event detector 425 can utilize any performance data 445 to determine, based on the performance data 445 if an event, such as a first responder event, had occurred within a prior period of time, such as within a prior 10, 15, 30 or 60 seconds, or within a prior 1, 2, 5 or 10 minutes.

Power controller 430 can include any combination of hardware or software for controlling power to other parts of the EV 105. Power controller 430 can include any functions, computer code, scripts or instructions stored in memory, such as main memory 315 or storage device 325, and executed on one or more processors, such as processor 310, for managing, controlling, electrically connecting or electrically disconnecting components of the EV 105. Power controller 430 can include the functionality for electrically connecting or disconnecting a restraint control module 470 or a battery pack 110. For example, power controller 430 can cause the control unit 405 to stop providing power to the restraint control module 470. CU 405 can cause a battery, such as a battery 515, to stop providing power to RCM 470. Power controller 430 can include the functionality to electrically disconnect or shut down the RCM 470. Power controller 430 can include the functionality to electrically disconnect or shut down a battery pack 110. Power controller 430 can send an instruction or a signal to contactor 465 to turn off or electrically decouple the battery pack 110 from the EV 105.

Indicator 435 can include any functionality to generate and send an indication or a notification on the state of the cut loop system 400. Indicator 435 can generate and send a notification or an indication that a cut loop (e.g., harness 450) was been cut or breached. Indicator 435 can generate and send a notification or an indication that a RCM 470 is electrically disconnected or uncoupled from a power source (e.g., CU 405 or battery 515). Indicator 435 can generate and send a notification or an indication that battery pack 110 is electrically disconnected or uncoupled from other parts of the EV 105. For example, indicator 435 can include a notification that battery pack 110 is electrically isolated from one or more components of the EV 105, such as a motor of the EV, a power train of the EV 105, or a notification module 510.

Communicator 440 can include any combination of hardware or software for establishing and carrying out communication between different parts of the EV 105, such as different control units 405, battery management systems 460, restraint control modules 470 and notification modules 510. Communicator 440 can include any functions, computer code, scripts or instructions stored in memory, such as main memory 315 or storage device 325, and executed on one or more processors, such as processor 310, for executing communication. Communicator 440 can include the functionality for implementing a platform controller area network (CAN) 520 between different modules or components of the EV 105. Communicator 440 can include the functionality for implementing Ethernet communication 530 between different parts of the EV 105. Communicator 440 can include the functionality for establishing communication, such as exchanging messages and notifications, between different control units 405.

Battery management system (BMS) 460 can include any combination of hardware, firmware and/or software for managing battery packs 110 and their interior components. BMS 460 can include the functionality to deliver stored power to the systems and components of the EV 105 or disconnecting the battery packs 110 from the remainder of the EV 105. BMS 460 can include functionality, such as scripts, functions and computer code stored in memory or operating on a processor. BMS 460 can include functionality for protecting the EV 105 or the battery pack 110 and facilitating the battery pack's operation within predetermined limits of operation or at a particular limited voltage level. BMS 460 can include firmware functions that can be implemented at a firmware level to facilitate a high fidelity of communication with onboard vehicle telemetry. BMS 460 can include functionality for regulating power from external charger to the battery packs 110 during charging. BMS 460 can enable or disable one or more systems or circuitry to maintain stasis at vehicle level. BMS 460 can communicate with and direct power from battery packs 110 to various EV components, such as motor, or other components, such as for example powertrain or drive inverter.

Contactors 465 can include electrical devices that can be used for switching on or off electrical circuits operating in a high current regime, such as for example an electric motor of a powertrain of an electric vehicle. Contactors 465 can include the functionality of a relay and can include a coil or an electromagnet. Contactors 465 can include an enclosure and one or more contacts for connecting to other components, such as driver components. Contactors 465 can be used, for example, to open a circuit under a potential short circuit load, thus preserving any exposed electronics from any potential high current short circuits. Contactors 465 can be deployed in the circuit controlling the voltage or power provided from the EV battery (e.g., battery packs 110) to the motor of the EV.

Restraint control module (RCM) 470 can include hardware, software, or any combination of hardware and software for controlling or monitoring activation or actuation of one or more elements of an EV 105. RCM 470 can control and manage activation or actuation of one or more airbags, one or more pre-tensioners for seatbelts, one or more automatic messages or communications to be sent, one or more phone calls, or similar. RCM 470 can be powered by the EV battery (e.g., battery packs 110) and can use pressure and acceleration sensors to detect instances in which airbags can be actuated. RCM 470 can include functionality, such as scripts, functions and computer code stored in memory or operating on a processor. RCM 470 can include hardware components implementing functionalities of the RCM 470 in hardware. For example, RCM 470 can include an object floating in a material or a magnetic field, triggering a signal in response to an event, such as a sufficiently strong impact. RCM 470 can include an airbag control unit that can include the functionality for actuating one or more airbags of the EV. RCM 470 can include functionality for sending a signal to actuate one or more airbags. RCM 470 can share or forward the signal to actuate an airbag. The signal to actuate an airbag can indicate occurrence of a first responder event, such as an impact, which can be forwarded or sent to a control unit 405. RCM 470 can forward an event indication or a message to CU 405, in response to detecting an event, such as a first responder event.

Figure 5:
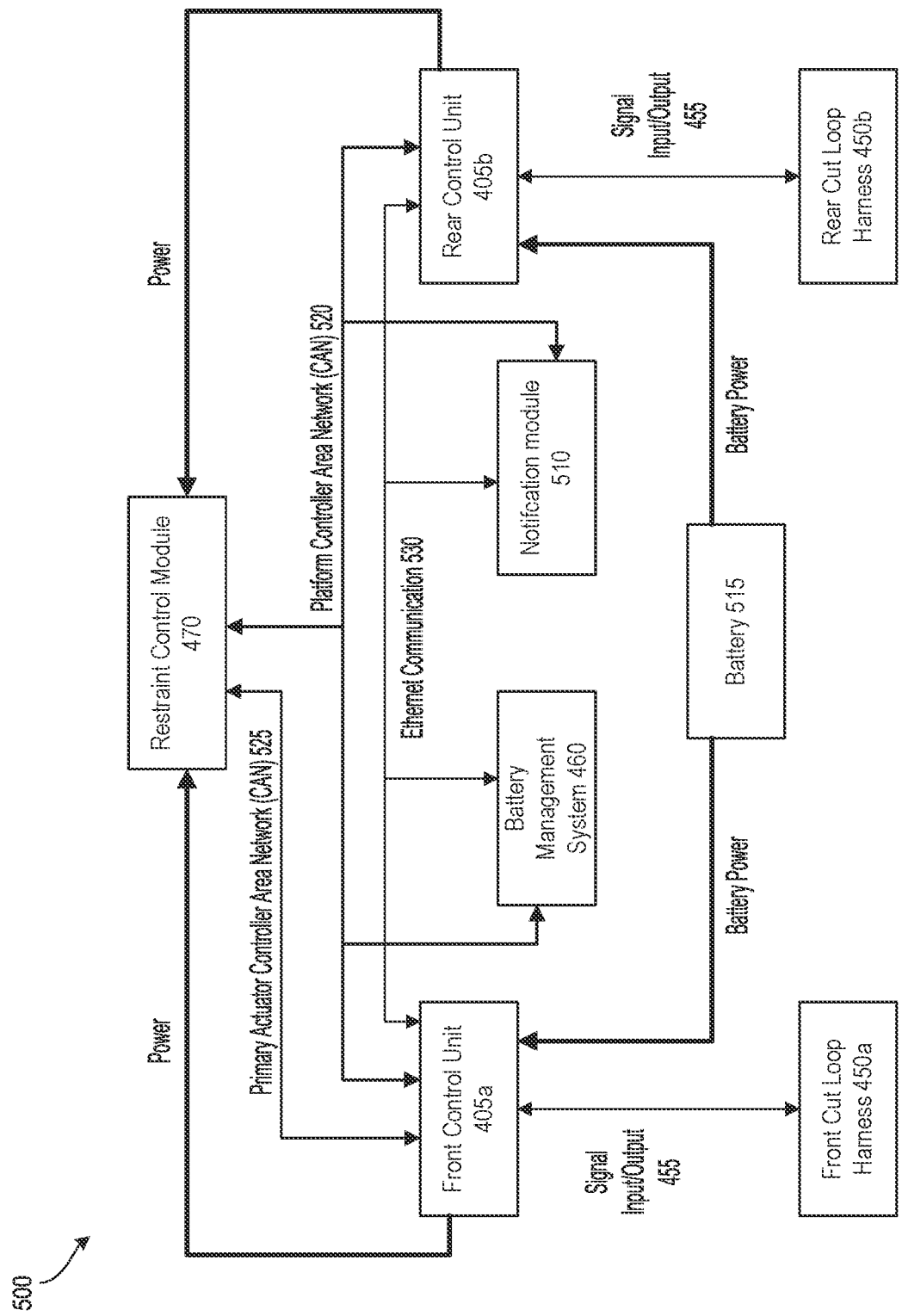
FIG. 5 depicts an example of a system diagram of a digital first responder cut loop in an electric vehicle.

FIG. 5 depicts an example system diagram 500 of a digital first responder cut loop 400. FIG. 5 shows a front control unit 405a that is coupled with a front cut loop harness 450a and a rear control unit 405b coupled with a rear control loop harness 450. The front CU 405a can input into a front cut loop harness 450a an input signal 455 and can detect, from the front cut loop harness 450a, an output signal 455. Similarly, the rear CU 405b can input into a rear cut loop harness 450b an input signal 455 and can detect, from the rear cut loop harness 450b, an output signal 455. Both CUs 405a and 405b can process the detected signal and determine if there is a change in the signal 455 (e.g., power feed loss between the input signal 455 and the output signal 455) in any of the front and rear cut loop harnesses 450a and 450b. Both CUs 405a and 405b can also monitor for any detections of first responder events.

CUs 405a and 405b can communicate with each other using a platform controller area network (CAN) 520 and Ethernet communication 530, which can be established and used for exchanging communication between the control units 405, battery management system 460, restraint control module 470 and a notification module 510. Front CU 405a can communicate with a RCM 470 using a primary actuator CAN 525 to receive any event detection messages from the RCM 470. Each control unit 405 can provide power to a RCM 470 and can receive power from a battery 515. Front and rear CUs 405a and 405b can communicate with each other, exchange information, messages and any indications of detected breach or cut (e.g., power feed loss of the signal 455) in any one of the front and rear cut loop harnesses 450a and 450b. In the event that CUs 405a or 405b detect breach in either of the harnesses 450a or 450b, in absence of a detected event, using exchanged information between them, the front and rear CUs 405a and 405b can monitor performance data 445 to determine if the event had taken place. Should CUs 405a and 405b detect a breach in either of the cut loop harnesses 450a and 450b and detect an first responder event, CUs 405a and 405b can shut down (e.g., electrically disconnect) the RCM 470 and the battery pack 110 and provide notifications on the state of the cut loop harnesses 450a an 450b, the RCM and the battery pack 110.

Notification module 510 can include any module of an EV 105 for receiving, displaying, sounding, or otherwise providing notifications or indications to an EV driver or a first responder. Notification module 510 can include an infotainment center of an EV 105. Notification module 510 can include a display and a sound system. Notification module 510 can include a system for sending receiving or sending text messages, phone calls or voice over IP calls.

Battery 515 can include any power source, such as a battery or a power generator. Battery 515 can include a battery source independent from a battery pack 110. Battery 515 can include one or more battery cells 120 forming a battery of any voltage output, such as 3V, 6V, 9V, 12V, 18V and 24V. Battery 515 can provide power to control units 405.

Controller area networks (CANs), such as a platform controller area network (CAN) 520 or a primary actuator controller area network (CAN) 525 can include any system of communication among controllers 405a and 405b, BMS 460, notification module 510 and RCM 470. Platform CAN 520 and Primary actuator CAN 525 can provide a message-based protocol communication between various components and devices, to share any signals, messages, instructions, indications, notification or any other data or information.

In some implementations, cut loop system 400 can utilize the communication features illustrated in the system diagram 500 to enable communication between front CU 405a and the rear CU 405b. For example, front CU 405a and rear CU 405b can each monitor their respective signals 455 in their respective cut loop harnesses 450. In some instances, one of the CUs 405a and 405b can detect a feed loss (e.g., a change in the detected signal 455 indicating a signal loss), while the other CU 405 may not detect any losses in its own signal 455. In such instances, the CU 405a or 405b that detected the power feed loss may notify the other controller 405a or 405b that the feed loss (e.g., change in signal 455) was detected. In that instance, the controllers 405a and 405b may determine if a first responder event had taken place, and if the first responder event is detected, the controllers 405 can determine to take action and electrically disconnect the RCM 470 and the battery pack 110.

A table shown below, presents different scenarios with respect to the power feed loss (e.g., change in the signal 455) being detected. For example, in the event in which neither of the CUs 405 detects any change in the signal, no action is taken. In another example, a rear CU 405b can detect a feed loss, while the front CU 405a does not detect any feed loss. In that situation, the rear CU 405b can notify the front CU 405a that power feed loss was detected, and the CUs 405 may determine, based on any potentially detected events, whether or not to take action with respect to the RCM 470 and the battery pack 110. In another example, a front CU 405a can detect a power feed loss, while the rear CU 405b does not detect any power feed loss. In such a situation, the front CU 405a can notify the rear CU 405b that power feed loss was detected, and the CUs 405 may determine, based on any detected event, whether or not to take action with respect to the RCM 470 and the battery pack 110. In the instance in which both front and rear CUs 405 detect the power feed loss, the action can be taken to shut down the RCM 470 and the battery pack 110.

| Front CU 405a, Feed Loss | Rear CU 405b, Feed Loss | Action |
|---|---|---|
| No | No | No action |
| No | Yes | Notify Front CU 405a |
| Yes | No | Notify Rear CU 405b |
| Yes | Yes | Shut down RCM 470 and battery pack 110 |

Figure 6:
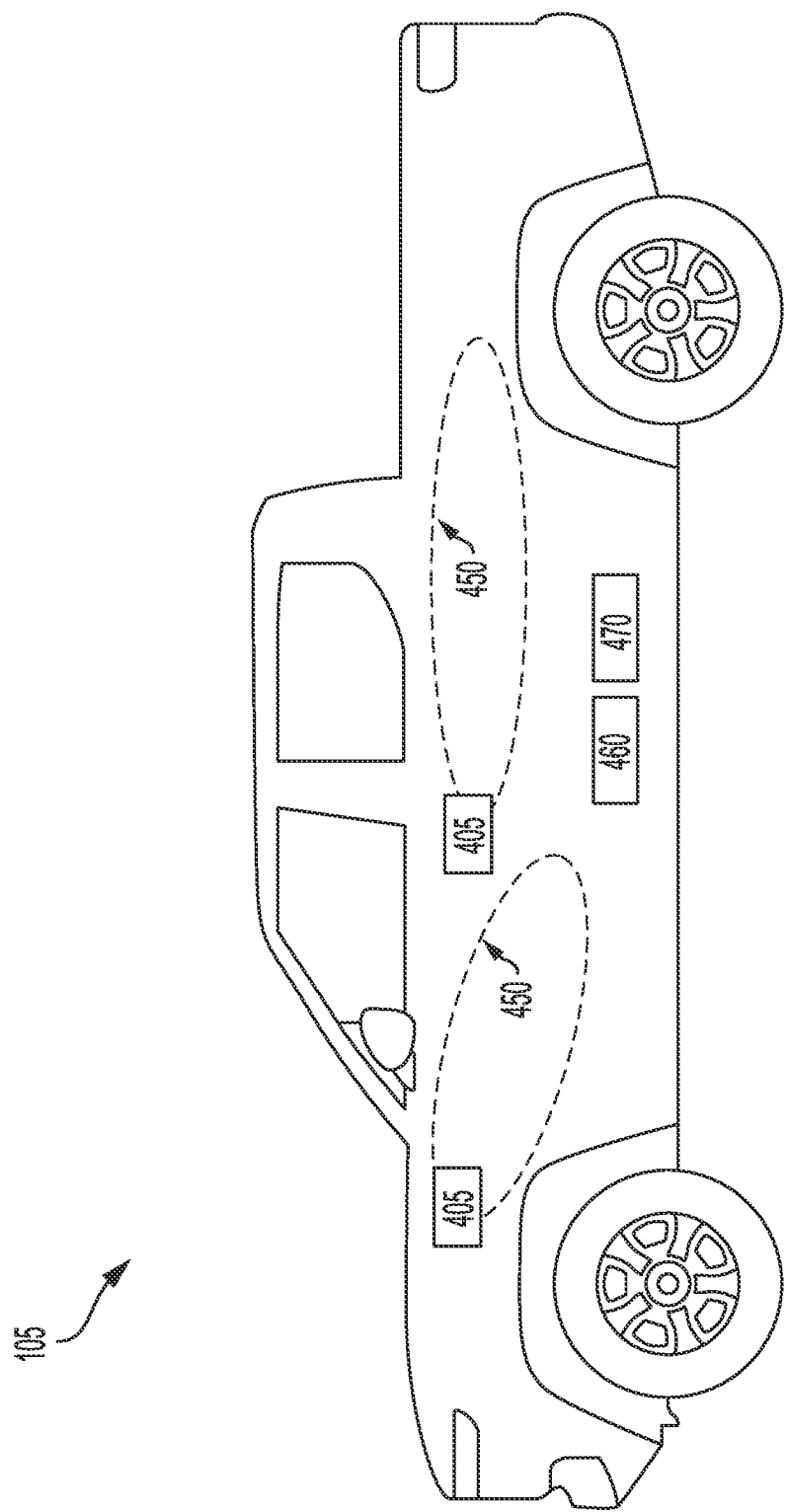
FIG. 6 is a diagram illustrating deployment of components of the system for implementing a digital first responder cut loop in an electric vehicle.

FIG. 6 illustrates a diagram of the cut loop harnesses 450 being deployed in different parts of an EV 105. For example, EV 105 can include two CUs 405a and 405b, each coupled to its own cut loop harness 450a or 450b. For example, a first CU 405a or 405b can be coupled to a first harness 450a or 450b that can be routed through a front part of an EV 105, such as through a front end of the EV. For example, a second CU 405a or 405b can be coupled to a second harness 450a or 450b that can be routed along a side and towards a rear part of the EV 105. Both harnesses 450a or 450b can include a single wire loop, or a bundle of two or more wires. Harnesses 450a or 450b can be of different lengths and sizes. CUs 405a or 405b can be in communication with each other and with the RCM 470 and the BMS 460. In response to detecting a change in the signal or an event (e.g., an accident or an impact involving a vehicle), CUs 405a or 405b can communicate with each other to determine if vehicle performance data 445 is consistent with an impact or an accident. CUs 405a or 405b can determine, based on the performance data 445, that the vehicle was or was not involved in an accident or an impact, and based on the determination set the state of the cut loop to breached facilitating the electrical disconnection of the RCM 470 or the battery pack 110.

In some aspects, the present disclosure relates to a cut loop system 400. The cut loop system 400 can include a harness 450 to receive a signal 455 that can be indicative of a state of a cut loop of an EV 105. The system 400 can include a controller 405 configured to detect an event, such as a first responder event, by event detector 425 of the controller 405. The controller 405 can also be configured to detect a change (e.g., power feed loss) in the signal 455 using a signal change detector 415 of the controller 405. Responsive to the detection of one of the event or the change in the signal 455, the controller 405 can be configured to electrically disconnect one of a restraint control module 470 of the EV 105 or a battery pack 110 of the EV 105.

The system 400 can include a second harness 450 to receive a second signal 455 indicative of the state of the cut loop. The second controller 405 can be configured to detect the event, such as the first responder event, by event detector 425 of the second controller 405 and to detect a change in the second signal 455 by the signal change detector 415 of the second controller. Responsive to detection of the event and responsive to one of the detection of the change in the signal or the detection of the change in the second signal, the second controller 405 can electrically disconnect the restraint control module 470 and the battery pack 110.

The system 400 can detect the change in the signal 455 based on a difference between a digital signal input (e.g., 455) into a wire of the harness 450 and the digital signal output (e.g., 455) from the wire of the harness 450. The controller 405 can electrically disconnect the restraint control module 470 and the battery pack 110. The system 400 can include the controller to electrically disconnect the restraint control module 470 and battery pack 110 in response to the detection of the event by the event detector 425 and in response to the detection of the change in the signal 455 by the signal change detector 415. The controller 405 can provide an indication, using indicator 435, that the restraint control module 470 and the battery pack 110 are electrically disconnected. The indication can be sent, via the communicator 440, to a notification module 510 to be displayed to the driver or the first responder.

The system 400 can include the restraint control module 470 to detect the event and send an event signal, via a primary actuator CAN 525 or platform CAN 520, indicative of the event to the controller 405. The controller 405 can electrically disconnect the restraint control module 470 and electrically disconnect the battery pack 110 in response to the event signal from the RCM 470. The system 400 can include a high voltage contactor 465 to electrically connect the battery pack 110 with another part of an EV 105, such as a motor of the EV 105. The high voltage contactor 465 can be configured to electrically disconnect the battery pack from the other parts of the EV 105, such as the motor, in response to the detection of the event and the detection of the change (e.g., power feed loss) in the signal by the controller 405.

The system 400 can include the controller 405 that is configured to detect the event (e.g., first responder event) in response to a determination, by the controller 405, that the event has occurred based on performance data 445. Performance data 445 can correspond to operation of the electric vehicle 105. The controller 405 can provide an indication of the state of the cut loop to the electric vehicle 105 or to a first responder. The state of the cut loop can be determined by the cut loop state monitor 420, based on the change in the signal 455. The indication can identify the cut loop as breached.

The system 400 can include a second controller 405 that can receive, from the controller 405, a message indicative of the detection of the event by the event detector 425 of the controller 405. The second controller 405 can be configured to electrically disconnect power to the restraint control module 470 and cause the battery pack 110 to be electrically disconnected by a high voltage contactor 465 in response to the message. The message can be received by the second controller 405 from the controller 405 via a communication network, such as a platform CAN 520 or Ethernet communication system 530.

The system 400 can include the controller 405 to input the signal 455 into a wire of the harness 450 and a second controller 405. The second controller 405 can be configured to receive output of the signal 455 from the wire of the harness 450. The second controller 405 can be configured to receive, from the controller, a message indicative of the detection of the event by the controller 405. The second controller 405 can be configured to detect the change in the signal 455 based on a difference between the input of the signal 455 into the wire and the output of the signal 455 from the wire.

The system 400 can include the harness 450 that receives the signal 455 input into the harness 450 from a power supply (e.g., battery 515). The system can include the controller 405 to receive the signal output 455 from the harness 450. The controller 405 can detect the change in the signal 455 (e.g., power feed loss) based on a difference between the signal 455 input into the harness 450 from the power supply (e.g., battery 515) and the signal 455 output from the harness 450. The controller 405 can send, from the indicator 435, an indication of the state of the cut loop. The indication can identify the cut loop as breached. The system 400 can include the signal 455 that is connected to a ground. The controller 405 can be configured to send to a second controller a message in response to detecting the change in the signal 455 (e.g., power feed loss). The second controller 405 can provide, using an indicator 435 of the second controller 405, an indication of the state of the cut loop in response to the message. The state of the cut loop can be, for example, that the cut loop is breached. The indication can also indicate that the RCM 470 and the battery pack are electrically disconnected.

In some aspects the present solution relates to an EV 105 that includes a cut loop system 400. The EV 105 can include a first harness 450 to receive a first signal 455 that can be indicative of a state of a cut loop of an EV 105. The state of the cut loop can be determined by the cut loop state monitor 420 based on the received first signal 450. The EV 105 can include a first controller 405 configured to detect an event (e.g., a first responder event) by an event detector 425 and to detect a change in the first signal 455 (e.g., power feed loss) using a signal change detector 415. The EV 105 can include a second harness 450 to receive a second signal 455 indicative of the state of the cut loop of the electric vehicle 105. The EV 105 can include a second controller 405 that can be configured to detect an event by an event detector 425 of the second controller 405 and to detect a change in the second signal 455 using a signal change detector 415 of the second controller 405. The first controller 405 or the second controller 405 can detect the event and detects one of the change in first signal or the change in the second signal. In response to the detection of the event and the detection of one of the change in the first signal or the change in the second signal, the first controller 405 or the second controller 405 can cause an RCM 470 of the EV 105 to be electrically disconnected and cause a battery pack 110 of the EV 105 to be electrically disconnected. The first controller 405 or the second controller 405 can provide an indication of the state of the cut loop. The state of the cut loop can be determined by the cut loop state monitor 420. The indication can identify the cut loop (e.g., harness 450) as breached.

In some aspects, the present solution relates to an electrical circuit of an EV 105. The electrical circuit can include a first harness 450 to propagate a first signal 455 to cause a first controller 405 to electrically connect a RCM 470 and cause one or more high voltage contactors 465 to electrically connect a battery pack 110 of the EV 105. The electrical circuit can include a second harness 450 to propagate a second signal 455 to cause a second controller 405 to electrically connect the RCM 470 and cause the one or more high voltage contactors 465 to electrically connect the battery pack 110. The battery pack can be connected to the remainder of the EV 105, such as powertrain, the motor and other EV 105 components. The first controller 405 or the second controller 405 can detect an event at the electric vehicle and detect one of the change in first signal 455 or the change in the second signal 455. In response to the detection of the event and the detection of one of the change in the first signal 455 or the change in the second signal 455, the first controller 405 or the second controller 405 can electrically disconnect the RCM 470 and cause the one or more high voltage contactors 465 to electrically disconnect the battery pack 110.

Figure 7:
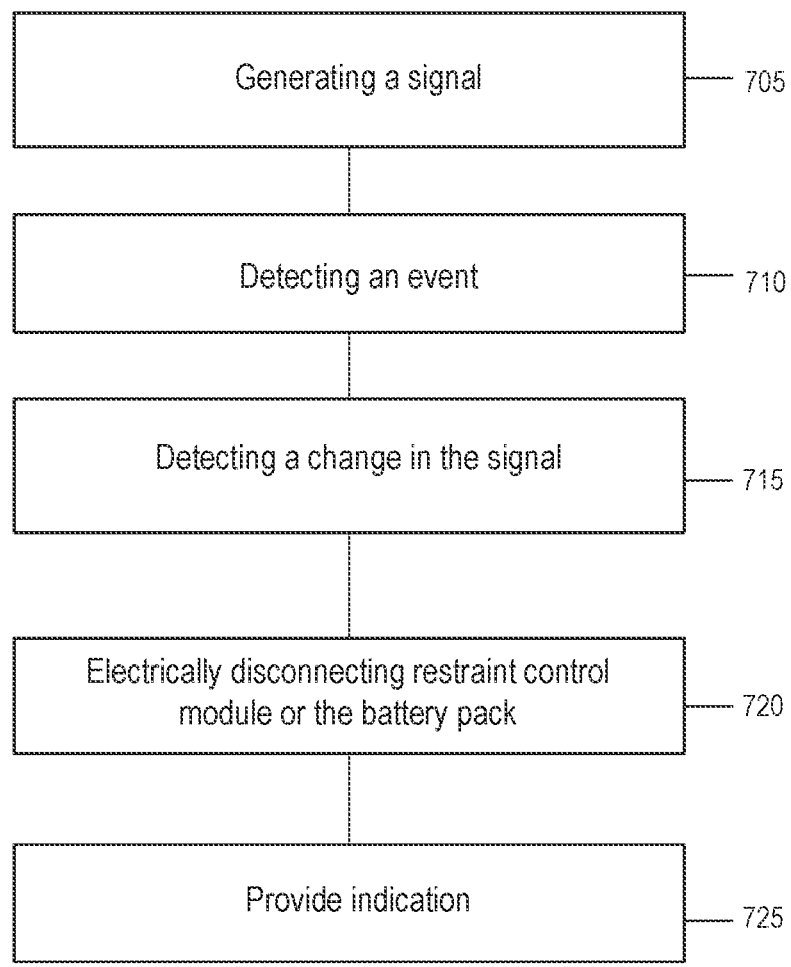
FIG. 7 is a flow diagram of an example method for implementing a digital first responder cut loop using the system features described in FIGS. 1-6.

FIG. 7 illustrates a method 700 for implementing a digital first responder cut loop. Method 700 can include ACTS 705-725. At ACT 705, the method receives a signal. At ACT 710, the method detects an event. At ACT 715, the method detects a change in the signal. At ACT 720, the method electrically disconnects restraint control module or the battery pack. At ACT 725, the method provides indication.

At ACT 705, the method generates or receives a signal. The method can generate, by a control unit, a signal through a harness of the electric vehicle. The control unit can be electrically connected to a restraint control module and a battery pack associated with an electric vehicle. The signal can be indicative of a state of a cut loop of an electric vehicle. The method can include a harness that receives a signal indicative of a state of a cut loop of an electric vehicle. The method can include a second harness that receives a second signal indicative of the state of the cut loop. The signal can be an analog signal, a digital signal, a PWM signal, an optical signal, a signal input from a power supply or a ground signal. A controller (e.g., control unit) can receive the signal output from the harness. The controller can receive the signal at the input pin of the controller that is electrically coupled with the harness. A second controller (e.g., second control unit) can receive the signal output from the second harness.

At ACT 710, the method detects an event. The event can be a first responder event, such as detected impact of an electric vehicle, a detected medical event of a driver or a passenger or any other event for a first responder. A controller can detect the event. A second controller can detect the event. A restraint control module can detect the event. The restraint control module can detect an impact to the vehicle. The restraint control module can send an event signal indicative of the event to the controller. The event signal can indicate that the event had occurred. The controller can detect the event based on a determination based on data corresponding to operation of the electric vehicle. Performance data can include data on vehicle movement, vehicle stopping, rate of deceleration, g-value of the shock based on the deceleration, data on any first responder calls, or any other performance data of the electric vehicle. For example, the controller can determine that the event has occurred in response to any one or more performance data.

At ACT 715, the method detects a change in the signal. The signal change detector of the controller can detect a change in the signal. The signal change detector of the second controller can detect a change in the second signal. The controller or the second controller can detect the change in the signal based on a difference between a digital signal input into a wire of the harness and the digital signal output from the wire of the harness. The controller can detect a change (e.g., power feed loss) in the signal in response to detecting that the power, intensity, voltage or current of the output signal is less than a predetermined threshold. The controller can detect the change (e.g., power feed loss) in the signal in response to comparing the signal generated by the signal controller and the signal output from the harness. The signal change detector can detect the change in the signal in response to detecting that no output signal is detected from the harness.

At ACT 720, the method electrically disconnects restraint control module or the battery pack. The method can include facilitating electrical disconnection, by the control unit, of at least one of a restraint control module of the electric vehicle or a battery pack of the electric vehicle in response to the detection of one of the event or the change in the signal. The electrical disconnection can be facilitated by sending, modifying, adding or removing a signal generated or provided by the control unit. The electrical disconnection can be facilitated by sending, modifying, adding or removing a signal to cause a circuit, a device or a control unit of the electric vehicle to electrically disconnect at least one of the restraint control module or the battery pack. For example, the control unit can send a signal to a battery management system to cause electrical disconnection. For example, the control unit can send, cease or modify a signal to the restraint control module or the battery pack or to a control unit controlling the power output to the restraint control module or the battery pack, in order to cause the electrical disconnection.

The controller can electrically disconnect one of a restraint control module of the electric vehicle or a battery pack of the electric vehicle in response to the detection of one of the event or the change in the signal. The second controller can electrically disconnect the restraint control module and the battery pack responsive to detection of the event and one of the detection of the change in the signal or the detection of the change in the second signal. The controller of the second controller can electrically disconnect the restraint control module and the battery pack responsive to the detected change in the signal. The controller of the second controller can electrically disconnect the restraint control module and battery pack in response to the detection of the event and the detection of the change in the signal. The controller or the second controller can electrically disconnect the restraint control module and the battery pack in response to the event signal being received from the restraint control module. The controller or the second controller can electrically disconnect the battery pack of the electric vehicle using a high voltage contactor. The high voltage contactor can receive the signal from the controller of the second controller to electrically disconnect the battery pack in response to the detection of the event and the detection of the change in the signal by the controller.

At ACT 725, the method provides indication. The controller or the second controller can utilize the indicator to provide an indication that the restraint control module and the battery pack are electrically disconnected. The controller or the second controller can provide an indication of the state of the cut loop to the electric vehicle or to a first responder. The indication can identify the cut loop as breached. The indication can identify the battery pack as electrically disconnected from the vehicle. The indication can identify the restraint control module as unpowered or disabled.

Some of the description herein emphasizes the structural independence of the aspects of the system components or groupings of operations and responsibilities of these system components. Other groupings that execute similar overall operations are within the scope of the present application. Modules can be implemented in hardware or as computer instructions on a non-transient computer readable storage medium, and modules can be distributed across various hardware or computer based components.

The systems described above can provide multiple ones of any or each of those components and these components can be provided on either a standalone system or on multiple instantiation in a distributed system. In addition, the systems and methods described above can be provided as one or more computer-readable programs or executable instructions embodied on or in one or more articles of manufacture. The article of manufacture can be cloud storage, a hard disk, a CD-ROM, a flash memory card, a PROM, a RAM, a ROM, or a magnetic tape. In general, the computer-readable programs can be implemented in any programming language, such as LISP, PERL, C, C++, C#, PROLOG, or in any byte code language such as JAVA. The software programs or executable instructions can be stored on or in one or more articles of manufacture as object code.

Example and non-limiting module implementation elements include sensors providing any value determined herein, sensors providing any value that is a precursor to a value determined herein, datalink or network hardware including communication chips, oscillating crystals, communication links, cables, twisted pair wiring, coaxial wiring, shielded wiring, transmitters, receivers, or transceivers, logic circuits, hard-wired logic circuits, reconfigurable logic circuits in a particular non-transient state configured according to the module specification, any actuator including at least an electrical, hydraulic, or pneumatic actuator, a solenoid, an op-amp, analog control elements (springs, filters, integrators, adders, dividers, gain elements), or digital control elements.

The subject matter and the operations described in this specification can be implemented in digital electronic circuitry, or in computer software, firmware, or hardware, including the structures disclosed in this specification and their structural equivalents, or in combinations of one or more of them. The subject matter described in this specification can be implemented as one or more computer programs, e.g., one or more circuits of computer program instructions, encoded on one or more computer storage media for execution by, or to control the operation of, data processing apparatuses. Alternatively or in addition, the program instructions can be encoded on an artificially generated propagated signal, e.g., a machine-generated electrical, optical, or electromagnetic signal that is generated to encode information for transmission to suitable receiver apparatus for execution by a data processing apparatus. A computer storage medium can be, or be included in, a computer-readable storage device, a computer-readable storage substrate, a random or serial access memory array or device, or a combination of one or more of them. While a computer storage medium is not a propagated signal, a computer storage medium can be a source or destination of computer program instructions encoded in an artificially generated propagated signal. The computer storage medium can also be, or be included in, one or more separate components or media (e.g., multiple CDs, disks, or other storage devices include cloud storage). The operations described in this specification can be implemented as operations performed by a data processing apparatus on data stored on one or more computer-readable storage devices or received from other sources.

The terms "computing device", "component" or "data processing apparatus" or the like encompass various apparatuses, devices, and machines for processing data, including by way of example a programmable processor, a computer, a system on a chip, or multiple ones, or combinations of the foregoing. The apparatus can include special purpose logic circuitry, e.g., an FPGA (field programmable gate array) or an ASIC (application specific integrated circuit). The apparatus can also include, in addition to hardware, code that creates an execution environment for the computer program in question, e.g., code that constitutes processor firmware, a protocol stack, a database management system, an operating system, a cross-platform runtime environment, a virtual machine, or a combination of one or more of them. The apparatus and execution environment can realize various different computing model infrastructures, such as web services, distributed computing and grid computing infrastructures.

A computer program (also known as a program, software, software application, app, script, or code) can be written in any form of programming language, including compiled or interpreted languages, declarative or procedural languages, and can be deployed in any form, including as a stand-alone program or as a module, component, subroutine, object, or other unit suitable for use in a computing environment. A computer program can correspond to a file in a file system. A computer program can be stored in a portion of a file that holds other programs or data (e.g., one or more scripts stored in a markup language document), in a single file dedicated to the program in question, or in multiple coordinated files (e.g., files that store one or more modules, sub programs, or portions of code). A computer program can be deployed to be executed on one computer or on multiple computers that are located at one site or distributed across multiple sites and interconnected by a communication network.

The processes and logic flows described in this specification can be performed by one or more programmable processors executing one or more computer programs to perform actions by operating on input data and generating output. The processes and logic flows can also be performed by, and apparatuses can also be implemented as, special purpose logic circuitry, e.g., an FPGA (field programmable gate array) or an ASIC (application specific integrated circuit). Devices suitable for storing computer program instructions and data can include non-volatile memory, media and memory devices, including by way of example semiconductor memory devices, e.g., EPROM, EEPROM, and flash memory devices; magnetic disks, e.g., internal hard disks or removable disks; magneto optical disks; and CD ROM and DVD-ROM disks. The processor and the memory can be supplemented by, or incorporated in, special purpose logic circuitry.

The subject matter described herein can be implemented in a computing system that includes a back end component, e.g., as a data server, or that includes a middleware component, e.g., an application server, or that includes a front end component, e.g., a client computer having a graphical user interface or a web browser through which a user can interact with an implementation of the subject matter described in this specification, or a combination of one or more such back end, middleware, or front end components. The components of the system can be interconnected by any form or medium of digital data communication, e.g., a communication network. Examples of communication networks include a local area network ("LAN") and a wide area network ("WAN"), an inter-network (e.g., the Internet), and peer-to-peer networks (e.g., ad hoc peer-to-peer networks).

While operations are depicted in the drawings in a particular order, such operations are not required to be performed in the particular order shown or in sequential order, and all illustrated operations are not required to be performed. Actions described herein can be performed in a different order.

Having now described some illustrative implementations, it is apparent that the foregoing is illustrative and not limiting, having been presented by way of example. In particular, although many of the examples presented herein involve specific combinations of method acts or system elements, those acts and those elements may be combined in other ways to accomplish the same objectives. Acts, elements and features discussed in connection with one implementation are not intended to be excluded from a similar role in other implementations or implementations.

The phraseology and terminology used herein is for the purpose of description and should not be regarded as limiting. The use of "including" "comprising" "having" "containing" "involving" "characterized by" "characterized in that" and variations thereof herein, is meant to encompass the items listed thereafter, equivalents thereof, and additional items, as well as alternate implementations consisting of the items listed thereafter exclusively. In one implementation, the systems and methods described herein consist of one, each combination of more than one, or all of the described elements, acts, or components.

Any references to implementations or elements or acts of the systems and methods herein referred to in the singular may also embrace implementations including a plurality of these elements, and any references in plural to any implementation or element or act herein may also embrace implementations including only a single element. References in the singular or plural form are not intended to limit the presently disclosed systems or methods, their components, acts, or elements to single or plural configurations. References to any act or element being based on any information, act or element may include implementations where the act or element is based at least in part on any information, act, or element.

Any implementation disclosed herein may be combined with any other implementation or embodiment, and references to "an implementation," "some implementations," "one implementation" or the like are not necessarily mutually exclusive and are intended to indicate that a particular feature, structure, or characteristic described in connection with the implementation may be included in at least one implementation or embodiment. Such terms as used herein are not necessarily all referring to the same implementation. Any implementation may be combined with any other implementation, inclusively or exclusively, in any manner consistent with the aspects and implementations disclosed herein.

References to "or" may be construed as inclusive so that any terms described using "or" may indicate any of a single, more than one, and all of the described terms. References to at least one of a conjunctive list of terms may be construed as an inclusive OR to indicate any of a single, more than one, and all of the described terms. For example, a reference to "at least one of 'A' and 'B'" can include only 'A', only 'B', as well as both 'A' and 'B'. Such references used in conjunction with "comprising" or other open terminology can include additional items.

Where technical features in the drawings, detailed description or any claim are followed by reference signs, the reference signs have been included to increase the intelligibility of the drawings, detailed description, and claims. Accordingly, neither the reference signs nor their absence have any limiting effect on the scope of any claim elements.

Modifications of described elements and acts such as variations in sizes, dimensions, structures, shapes and proportions of the various elements, values of parameters, mounting arrangements, use of materials, colors, orientations can occur without materially departing from the teachings and advantages of the subject matter disclosed herein. For example, elements shown as integrally formed can be constructed of multiple parts or elements, the position of elements can be reversed or otherwise varied, and the nature or number of discrete elements or positions can be altered or varied. Other substitutions, modifications, changes and omissions can also be made in the design, operating conditions and arrangement of the disclosed elements and operations without departing from the scope of the present disclosure.

For example, descriptions of positive and negative electrical characteristics may be reversed. Further relative parallel, perpendicular, vertical or other positioning or orientation descriptions include variations within +/−10% or +/−10 degrees of pure vertical, parallel or perpendicular positioning. References to "approximately," "substantially" or other terms of degree include variations of +/−10% from the given measurement, unit, or range unless explicitly indicated otherwise. Coupled elements can be electrically, mechanically, or physically coupled with one another directly or with intervening elements. Scope of the systems and methods described herein is thus indicated by the appended claims, rather than the foregoing description, and changes that come within the meaning and range of equivalency of the claims are embraced therein.

What is claimed is:

1. A system, comprising:
a first control unit of a first harness of a cut loop of an electric vehicle to execute instructions and configured to:
generate a first signal through the first harness of the cut loop of the electric vehicle, wherein the first signal is indicative of a state of the cut loop of the electric vehicle in the first harness, wherein the first control unit is electrically connected to a restraint control module and a battery pack associated with the electric vehicle;
detect, using the restraint control module, an event associated with the vehicle and a change in the first signal above a first threshold level in the first harness coupled with the restraint control module;
wherein the first signal is connected to a ground, and the first control unit is configured to send to a second control unit a message in response to detecting the change in the first signal, and the second control unit provides an indication of the state of the cut loop in response to the message;
receive, from the second control unit of a second harness of the cut loop of the electric vehicle, an indication of a change in a second signal in the second harness above a second threshold; and
cause electrical disconnection of the restraint control module of the electric vehicle and the battery pack of the electric vehicle from the electric vehicle, responsive to the detection of the event, the change in the first signal, and the indication of the change in the second signal from the second control unit.

2. The system of claim 1, comprising:
the second harness to receive the second signal indicative of the state of the cut loop; and
wherein the second control unit is configured to detect the event or the change in the second signal above the second threshold level and responsive to detection of the event, cause electrical disconnection of the restraint control module and the battery pack.

3. The system of claim 1, comprising:
the first control unit to detect the change in the first signal based on a difference between a digital signal input into a wire of the first harness and the first signal output from the wire of the first harness.

4. The system of claim 1, comprising:
the first control unit to
provide to the second control unit, a second indication that the restraint control module and the battery pack are electrically disconnected.

5. The system of claim 1, comprising:
the restraint control module to detect the event and send an event signal indicative of the event to the first control unit; and
the first control unit to electrically disconnect the restraint control module and electrically disconnect the battery pack in response to the event signal.

6. The system of claim 1, comprising:
a high voltage contactor to electrically connect the battery pack with a motor of the electric vehicle, wherein the high voltage contactor is configured to cause electrical disconnection of the battery pack from the motor in response to the detection of the event and the detection of the change in the first signal by the first control unit.

7. The system of claim 1, wherein the first control unit is configured to detect the event responsive to a determination, based on data corresponding to operation of the electric vehicle, that the event has occurred, and comprising:
the first control to provide a second indication of the state of the cut loop to the electric vehicle or to a first responder, the second indication identifying the cut loop as breached.

8. The system of claim 1, comprising:
the second control unit to receive, from the first control unit, a message indicative of the detection of the event by the first control unit, the second control unit configured to cause electrical disconnection of power to the restraint control module and cause the battery pack to be electrically disconnected by a high voltage contactor in response to the message indicative of the detection of the event.

9. The system of claim 1, comprising:
the first control unit to input the first signal into a wire of the first harness; and
the second control unit of the cut loop configured to communicate with the first control unit and to:
receive output of the first signal from the wire of the first harness;
receive, from the control unit, a message indicative of the detection of the event by the first control unit; and
detect the change in the first signal based on a difference between the input of the signal into the wire and the output of the signal from the wire.

10. The system of claim 1, wherein the first harness receives the first signal input into the first harness from a power supply, the system comprising:
the first control unit to:
receive the signal output from the first harness;
detect the change in the first signal based on a difference between the first signal input into the first harness from the power supply and the first signal output from the first harness; and
send a second indication of the state of the cut loop, the second indication identifying the cut loop as breached.

11. A method, comprising:
generating, by a first control unit of a first harness of a cut loop electrically connected to a restraint control module and a battery pack associated with an electric vehicle, a first signal through the first harness of the electric vehicle in the first harness, wherein the first signal is indicative of a state of a cut loop of an electric vehicle;
detecting, using the restraint control module, an event associated with the electric vehicle;
detecting, by the first control unit, a change in the first signal above a first threshold level in the first harness coupled with the restraint control module;

wherein the first signal is connected to a around, and the first control unit is configured to send to a second control unit a message in response to detecting the change in the first signal, and the second control unit provides an indication of the state of the cut loop in response to the message;

receiving, by the first control unit, from the second control unit of a second harness of the cut loop of the electric vehicle, an indication of a change in a second signal in the second harness above a second threshold; and facilitating electrical disconnection, by the first control unit, of the restraint control module and the battery pack from the electric vehicle in response to the detection of the event, the indication of the change in the second signal from the second control unit, and the change in the first signal.

12. The method of claim 11, comprising:
receiving, by the second harness, the second signal indicative of the state of the cut loop,
detecting, by the second control unit, the event;
detecting, by the second control unit, the change in the second signal; and
facilitating electrical disconnection, by the second control unit, of the restraint control module and the battery pack responsive to detection of the event.

13. The method of claim 11, comprising:
detecting, by the first control unit, the change in the first signal based on a difference between a digital signal input into a wire of the first harness and the digital signal output from the wire of the first harness.

14. The method of claim 11, comprising:
facilitating electrical disconnection, by the first control unit,
providing a second indication that the restraint control module and the battery pack are electrically disconnected.

15. The method of claim 11, comprising:
detecting, by the restraint control module, the event;
sending, by the restraint control module, an event signal indicative of the event to the first control unit; and
electrically disconnecting, by the first control unit, the restraint control module and the battery pack in response to the event signal.

16. The method of claim 11, comprising:
facilitate electrical disconnection, by a high voltage contactor, of the battery pack of the electric vehicle in response to the detection of the event and the detection of the change in the first signal by the first control unit.

17. The method of claim 11, comprising:
detecting, by the first control unit, the event based on a determination based on data corresponding to operation of the electric vehicle;
providing, by the first control unit, a second indication of the state of the cut loop to the electric vehicle or to a first responder, the second indication identifying the cut loop as breached.

18. An electric vehicle, comprising:
a first harness to receive a first signal indicative of a state of a cut loop of the electric vehicle;
a first control unit configured to detect an event and to detect a change in the first signal;
a second harness to receive a second signal indicative of the state of the cut loop of the electric vehicle;
a second control unit configured to detect an event and to detect a change in the second signal;
wherein the first signal is connected to a ground, and the first control unit is configured to send to the second control unit a message in response to detecting the change in the first signal, and the second control unit provides an indication of the state of the cut loop in response to the message; and
wherein the first control unit:
 detects, using a restraint control module, the event;
 receives from the second control unit an indication of the change in the second signal in the second harness;
 detects the change in first signal in the first harness coupled with the restraint control module and the change in the second signal in the second harness coupled with the restraint control module; and
 in response to the detection of the event and the detection of the change in the first signal and the received indication of the change in the second signal, facilitates electrical disconnection, from the electric vehicle, of the restraint control module of the electric vehicle and a battery pack of the electric vehicle.

19. The electric vehicle of claim 18, wherein one of the first control unit or the second control unit provides a second indication of the state of the cut loop, the second indication identifying the cut loop as breached.

* * * * *